United States Patent [19]

Bagley

[11] 4,036,020
[45] July 19, 1977

[54] METHOD AND APPARATUS FOR PRODUCING A DIRECTED, HIGH-VELOCITY STREAM OF COMPRESSIBLE FLUID

[76] Inventor: Charles Stuart Bagley, 1314 Ohio Ave., Alamogordo, N. Mex. 88310

[21] Appl. No.: 640,872

[22] Filed: Dec. 15, 1975

[51] Int. Cl.² ............................................. F01D 25/08
[52] U.S. Cl. ........................................ 60/644; 60/650; 239/135; 239/139; 415/178; 415/182; 415/202
[58] Field of Search .................. 239/135, 139; 60/650, 60/682; 415/178, 182, 202

[56] References Cited
U.S. PATENT DOCUMENTS 1,908,066  5/1933  Sedlmeir ............................ 239/139 X

*Primary Examiner*—Allen M. Ostrager
*Attorney, Agent, or Firm*—Mallinckrodt & Mallinckrodt

[57] ABSTRACT

A directed, high-velocity stream of compressible fluid is produced and put to use (as in a turbine) by adding heat to such fluid as it flows through and expands within an elongate nozzle prior to discharge therefrom but following passage through a throat of such nozzle. The fluid is supplied to the nozzle at pressure greater than the atmosphere into which the high-velocity stream is directed and discharged. Apparatus for carrying out the method of the invention comprises one or more elongate nozzles, each having a throat and constructed with means for adding heat to fluid flowing from such throat toward the nozzle outlet through an elongate discharge portion of the nozzle having flow passage of effective cross-sectional area that gradually increases from the nozzle throat to the nozzle outlet. A preferred form of the apparatus includes an elongate center unit which converges from end to end thereof and is positioned within the discharge portion of the nozzle in spaced relationship with the walls thereof and with its larger end adjacent to the nozzle throat and its smaller end adjacent to the nozzle outlet, so as to divide flow of fluid through such discharge portion.

16 Claims, 12 Drawing Figures

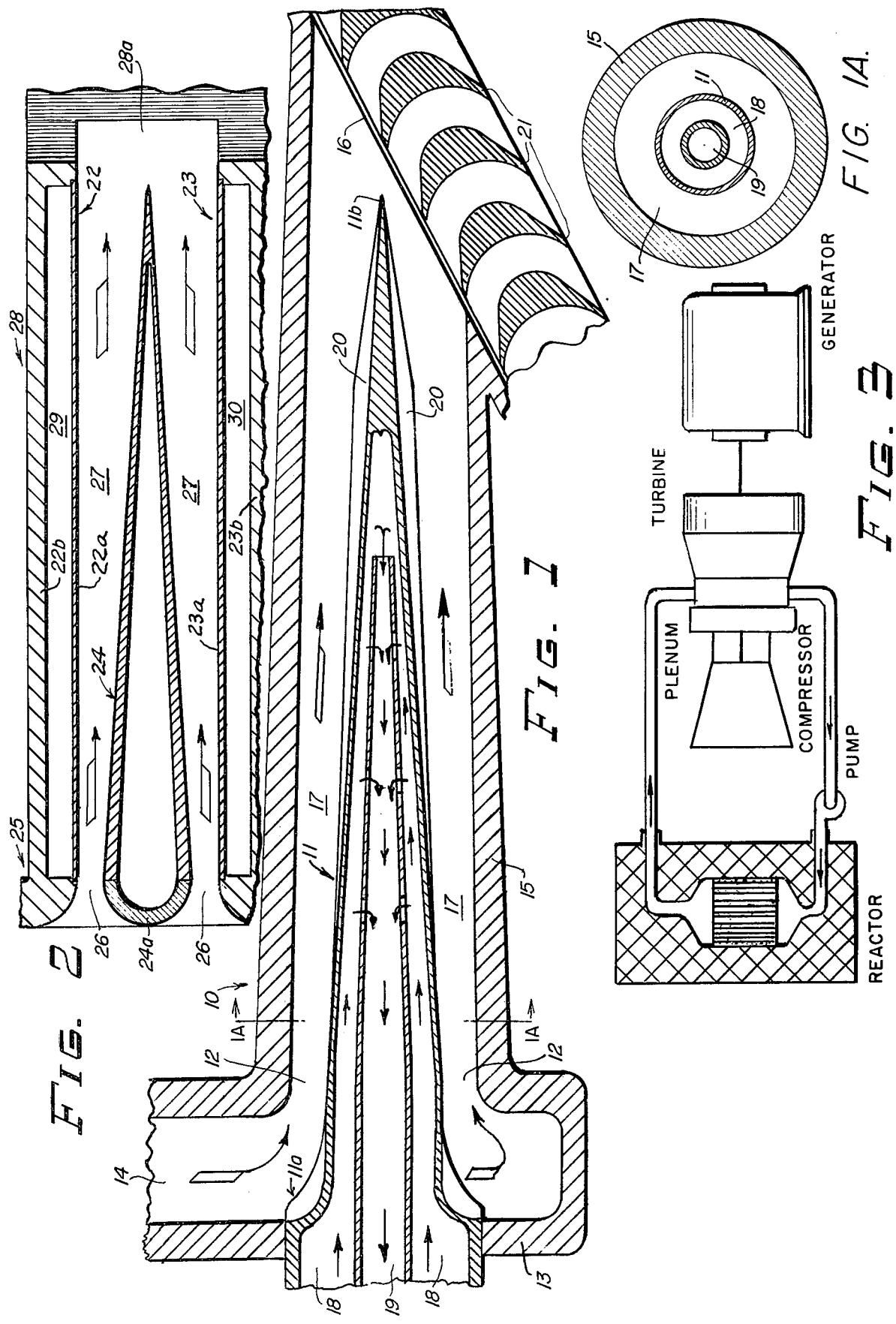

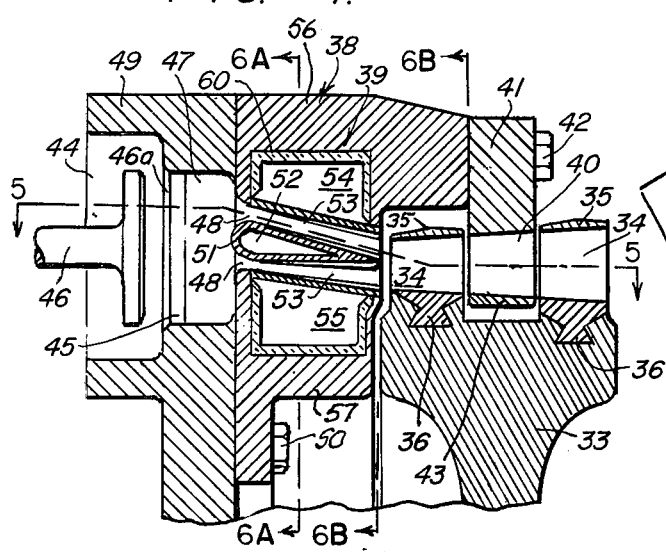
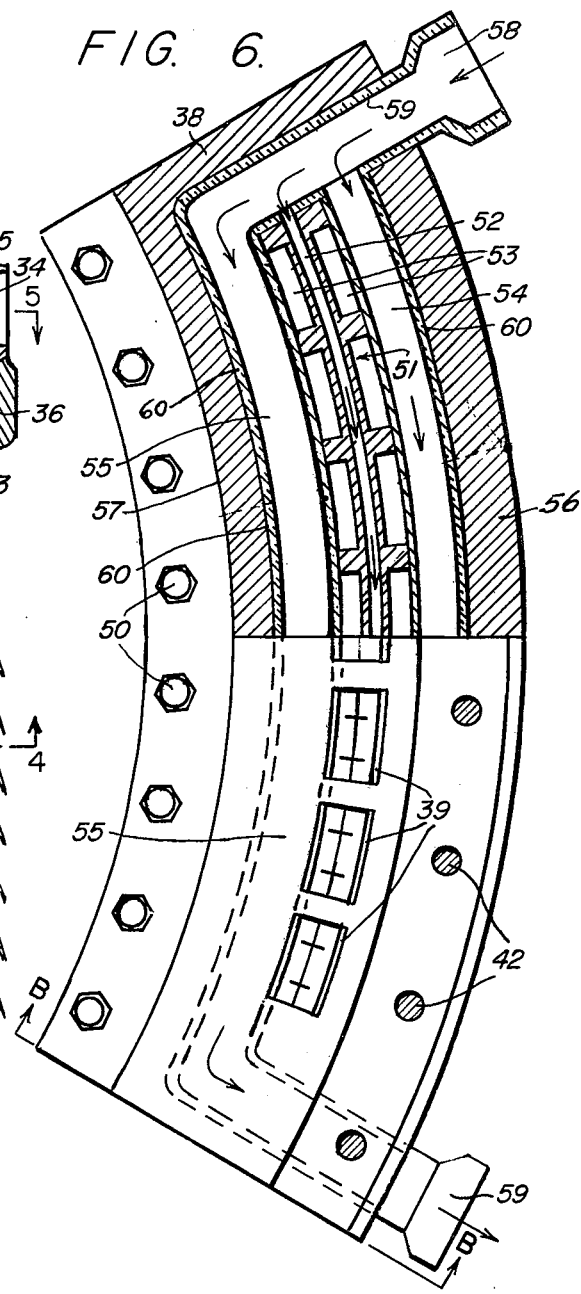
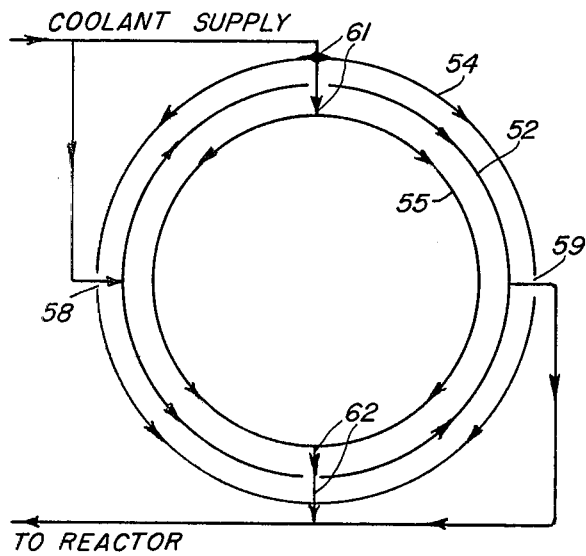
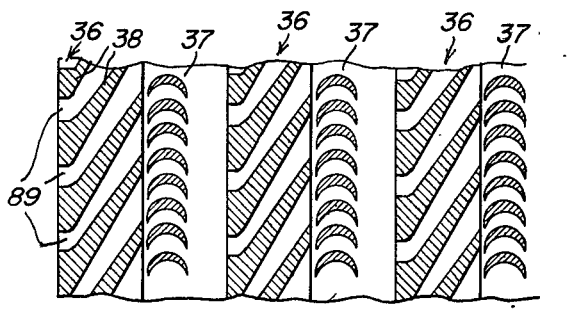

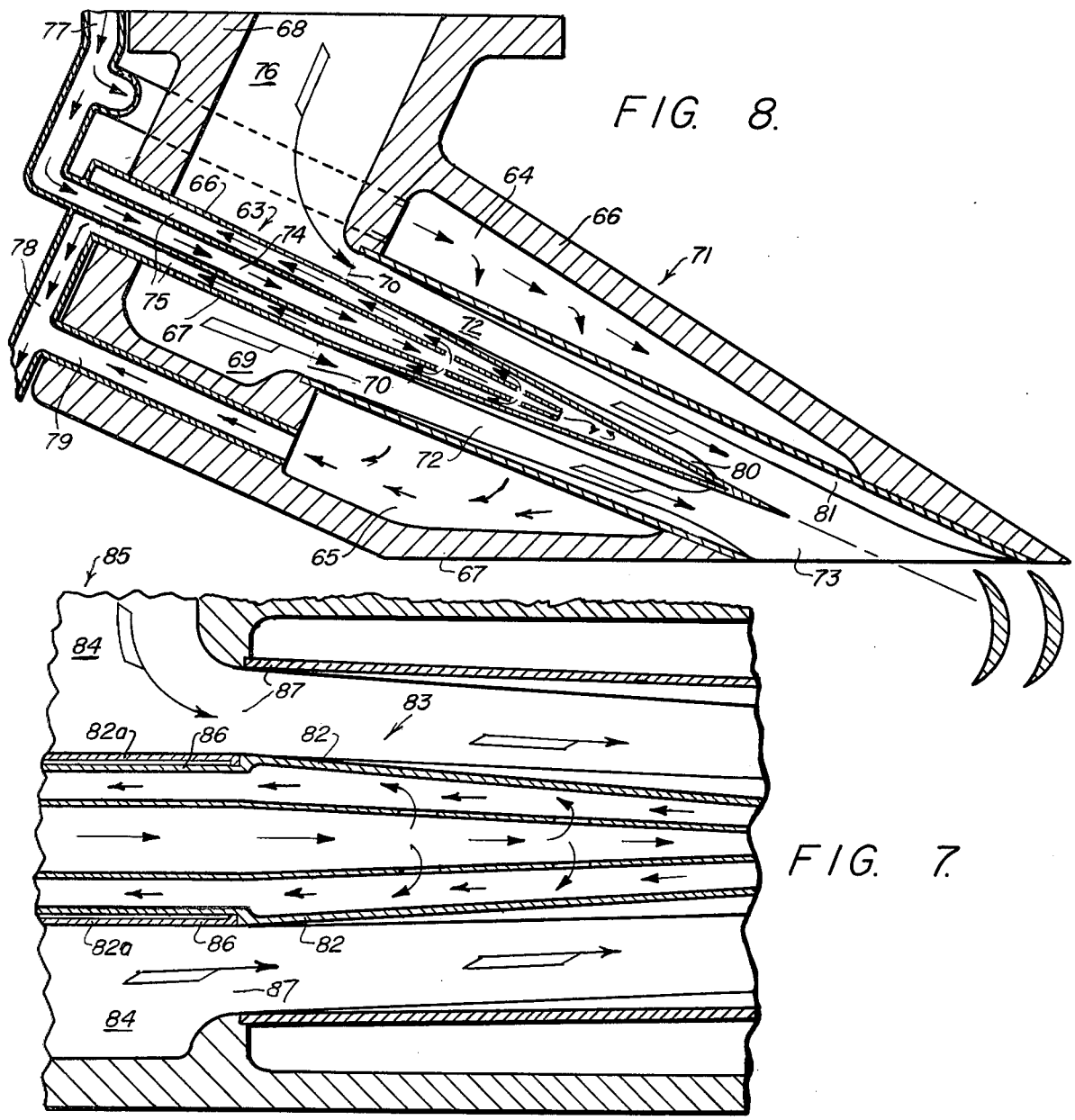
FIG. 8.
FIG. 7.
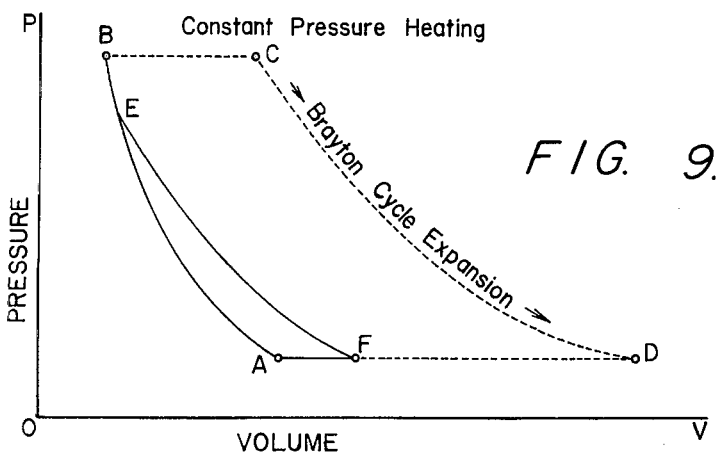
FIG. 9.

METHOD AND APPARATUS FOR PRODUCING A DIRECTED, HIGH-VELOCITY STREAM OF COMPRESSIBLE FLUID

BACKGROUND OF THE INVENTION

1. Field

The invention is in the field of methods and equipment for producing directed, high-velocity streams of compressible fluids, particularly useful in operating gas turbines.

2. State of the Art

In present turbines, the Brayton cycle is used to generate directed, high velocity streams of compressible fluids. This cycle consists of adiabatic compression of the fluid in which the enthalpy is increased by mechanical work; constant pressure heating that further increases the enthalpy of the fluid; and adiabatic expansion by which a portion of the enthalpy of the fluid is converted to velocity. The heating is usually obtained by combustion of fuel with the fluid.

The Brayton cycle has a disadvantage in that, when heat is added to the fluid without a corresponding increase in pressure before entering the expansion part of the cycle, a substantial part of the added heat becomes unavailable for conversion to kinetic energy. This is because the nozzle concerned is dependant, for its ability to expand the fluid and thereby convert its thermal energy into kinetic energy, on a commensurate pressure differential between inlet and outlet ends of the nozzle. In the Brayton cycle, the pressure at the inlet of the nozzle is normally that of the compressed fluid being supplied by the compressor. Any addition of heat within the nozzle that increases the pressure requires a corresponding increase in the work of the compressor and consequently offsets the advantage otherwise gained by the addition of heat. Therefore, in the Brayton cycle, heat is added in such a way as to insure that the pressure remains constant.

Adiabatic compression is thermodynamically a reversible process, i.e. isentropic, and the compressor work is essentially all recoverable as equivalent kinetic energy during expansion of the compressed fluid in a suitable nozzle. The same is not true for thermal energy added to the fluid at constant pressure. Such energy addition is largely an irreversible process and the main cause of low thermodynamic efficiencies in current methods of producing directed high velocity streams of compressible fluids. In those cases where pressure ratios would require convergent-divergent nozzle types for complete expansion of the fluid, the recoverable portion of the enthalpy of the fluid is due almost entirely to compressor work that is non-productive so far as end results are concerned. The productive portion of the fluid cycle comes from the limited advantage that can be gained by raising the temperature and by thereby increasing the critical or acoustic velocity which is recoverable in nozzles of the convergent type. This has led to the exclusive use of convergent type nozzles in current gas turbines and jet engines and a trend toward ever higher temperatures in order to obtain higher velocities and more favorable ratios between productive and non-productive work. The heat units required to secure a given velocity in this way, however, are always more than those required to obtain equivalent kinetic energy, because the higher the velocity that can be obtained the higher the exhaust temperature and consequently the greater the the heat loss. It is common in present gas turbines for the energy lost to be twice as much as the energy converted to flow velocity. Various devices are employed to recover as much of this waste heat as possible, but such devices are complicated, costly, and generally capable of recovering only a small part of the lost thermal energy.

In contrast to the Brayton cycle, steam turbines employ the Rankine cycle wherein steam is heated in a closed vessel. In this way, pressure is increased along with temperature. The process compares to that of adiabatic compression in gas turbines and consequently is essentially isentropic and therefore thermodynamically reversible. Most of the thermal energy added is recoverable as kinetic energy in suitably designed nozzles. However, because a vapor cycle is used, the exit steam still contains large amounts of heat of vaporization, which is lost in the condensers as the spent steam gives up its heat to whatever cooling medium is used. Generally, the quantity of heat absorbed in the condensers is two or three times as much as that converted to kinetic energy in the rest of the turbine cycle.

SUMMARY OF THE INVENTION

According to the invention, heat is added to an expanding fluid along an elongate discharge portion of a nozzle whose effective cross-sectional area gradually increases from a nozzle throat to a nozzle outlet, thereby increasing the discharge velocity of the fluid. The normal tendency of the fluid to cool and lose pressure as it expands is counteracted by the added heat, most of which is converted directly to kinetic energy in the form of additional velocity of the fluid being discharged.

In practicing the method of the invention, a compressible fluid is compressed to a pressure greater than atmospheric, or, in the case of a closed system, to a pressure greater than that prevailing in the exhaust-receiving chamber. The compressed fluid expands as it passes through the inlet portion, throat, and discharge portions of the nozzle. Heat is added to the fluid as it expands in the discharge portion of the nozzle, thereby causing further expansion and increasing the velocity of the fluid. The fluid is exhausted through the outlet of the nozzle as a directed, high velocity stream.

The apparatus includes an elongate nozzle having passage for the flow of fluid therethrough from an inlet at one end of the nozzle to an outlet at the other end thereof and having a throat therebetween located near the inlet and dividing the nozzle into a relatively short inlet portion and a relatively long discharge portion. The effective cross-sectional area of such passage for flow of fluid through and along the discharge portion of the nozzle increases from the throat to the outlet. Means is provided to supply fluid to the inlet of the nozzle at greater than the pressure of the atmosphere into which the stream of fluid is discharged, so the fluid will expand as it flows through the inlet portion, throat, and discharge portions of the nozzle to discharge through the outlet of the nozzle. Means is provided to add heat to the fluid as it expands within the discharge portion of the nozzle.

In order to confine and narrowly direct the stream of fluid, it is usually preferable that the outlet of the nozzle be no larger than the throat, or that the outlet be smaller than the throat. In such cases, an elongate and convergent center unit is provided within and along the discharge portion of the nozzle, with its larger end adjacent to the nozzle throat or to the nozzle inlet and its small end adjacent to the nozzle outlet. In this way, what would normally be considered a covergent nozzle is given the properties of a divergent nozzle. The effective cross-sectional area of such nozzle, i.e. the area through which the fluid flows, increases from the nozzle throat to the nozzle outlet, but the nozzle retains its ability to narrowly confine and direct the stream of fluid.

The nozzle may be circular in cross-section, in which case the central unit will be conical. The nozzle may, however, have other than a circular cross-section, e.g. rectangular, in which chase the center unit will be correspondingly shaped, e.g. of wedge shape.

It is generally convenient and preferable that the center unit serve as a heating means for fluid flowing through the discharge portion of the nozzle. Under such circumstances, such center unit is heated to a temperature significantly greater than the temperature of the compressible fluid, so that heat transfer from unit to fluid takes place in and along the discharge portion of the nozzle. Heating of the center unit may easily be accomplished electrically or by circulating a hot fluid therethrough. The fluid may be heated by a nuclear reactor, a conventional furnace, or some other heat source. Again, the center unit may serve as a flame holder, fuel being introduced thereinto and burned therein.

It will often be desirable to heat not only the center unit but also inner wall surfaces of the discharge portion of the nozzle, so that heat is transferred to the fluid from both the center unit and the nozzle walls, thereby providing a greater rate of heat transfer per unit time. Alternatively, the nozzle walls alone can serve as the source of heat. This is true, of course, whether or not a center unit is employed. Thus, in nozzles which have the outlet larger than the throat, generally known as divergent nozzles, center units may be used but are not necessary. In such nozzles, if no center unit is used, the nozzle walls must serve as heating elements.

The invention is particularly suited for use with a nuclear reactor, cooling fluid from the reactor being circulated through the heating elements of turbine nozzles in accordance with the invention after it has picked up heat from the reactor. The turbine advantageously operates an electrical generator.

DRAWINGS

The best mode presently contemplated of carrying out the invention will be understood from the detailed description of the several embodiments illustrated in the accompanying drawings, in which:

FIG. 1 is a fragmentary view in longitudinal section taken axially through one of the nozzles of a gas turbine incorporating the invention and including a conical center unit as a heater;

FIG. 1A, a transverse section taken on the line 1A—1A of FIG. 1 and drawn to a somewhat smaller scale;

FIG. 2, a view similar to that of FIG. 1 but somewhat more fragmentary in character and showing a different embodiment of the invention wherein the nozzles are rectangular in cross-section and are equipped with heaters in the walls thereof, as well as with center units;

FIG. 3, a diagrammatic showing of apparatus of the invention arranged as an electrical generating system employing a turbine equipped with nozzles of the invention, a nuclear reactor for supplying heated fluid to the nozzles, and an electric generator run by the turbine;

FIG. 4, a fragmentary view in vertical section taken through a typical turbine nozzle block (see the line 4—4 of FIG. 5) incorporating nozzles corresponding in general with the showing of FIG. 2;

FIG. 5, a fragmentary view in horizontal section taken on the line 5—5 of FIG. 4;

FIG. 6, a composite sectional view of the same nozzle block, the upper part of the view being in vertical section taken along the line 6A—6A of FIG. 4 and the lower part being in offset vertical section taken on the line 6B—6B of FIG. 4, the view showing one segment only of the nozzle block extending 60° or one-sixth the periphery of a circular turbine wheel;

FIG. 7, a view corresponding to but drawn to a somewhat larger scale than that of FIG. 1 and more fragmentary, a somewhat different embodiment being shown;

FIG. 8, another view corresponding to that of FIG. 1, but illustrating still another embodiment of the invention;

FIG. 9, a graph plotting pressure vs. volume on a comparative basis;

FIG. 10, a flow diagram representing a semi-conductor type of coolant flow from a nuclear reactor and full peripheral admission of the coolant to the nozzle blocks of the invention; and FIG. 11, a fragmentary sectional view corresponding to that of FIG. 5, but illustrating how several nozzle blocks may be arranged to operate in series as a multiple-stage turbine.

DETAILED DESCRIPTION OF THE ILLUSTRATED EMBODIMENTS

As illustrated in FIGS. 1 and 1A, a convergent nozzle 10, having a flow passage therethrough that is circular in cross-section, is provided with a conical center unit 11 positioned to make the normal nozzle throat an annular throat 12. The nozzle comprises a relatively short inlet portion 13, that converges into the throat from a nozzle passage 14, as an inlet, and an elongate discharge portion 15 that extends from the throat to an outlet 16. Even though the nozzle itself is of convergent type, the effective cross-sectional area of its annular flow passage 17 increases continuously from throat 12 to outlet 16 because of center unit 11, whose larger end 11a is adjacent to throat 12 and whose smaller end or apex 11b is adjacent to outlet 16. Thus, nozzle 10 has the physical properties of a divergent nozzle, while, at the same time, maintaining the advantages of being able to confine and narrowly direct the stream of fluid, as is characteristic of a convergent nozzle. In order to produce the continuously increasing cross-sectional area, the conical center unit 11 converges toward its apex at a greater rate than do the walls of discharge portion 15 of the nozzle toward outlet 16. Inlet portion 13 and part of inlet passage 14 provide a plenum chamber just ahead of nozzle throat 12.

Conical center unit 11 serves as a heater, and, for this purpose, is hollow and divided into flow passages 18 and 19 through which a hot heating fluid from any suitable source is circulated, as indicated by the appended arrows in FIG. 1. Fins 10 may be provided on such center unit to increase the heat transfer area thereof.

In operation, compressed fluid such as air, preferably at a pressure greater than twice the pressure of the atmosphere into which the stream of fluid is exhausted, is supplied to the plenum chamber through inlet passage 14 and flows through throat 12. As it flows through divergent annular passage 17 along discharge portion 15 of the nozzle, it expands continuously up to the point of discharge through outlet 16. In expanding, a substantial portion of the internal thermal energy due to adiabatic compression of the fluid is converted to kinetic energy of flow. The temperature of the fluid drops as the pressure falls and the velocity of low increases. This behavior is normal for elastic fluid nozzles. Here, however, heating element 11 is maintained at a temperature significantly higher than that of the fluid flowing past it, so that heat is continually imparted to the expanding fluid. This added heat counteracts the tendency of the fluid to cool and reduces the rate at which the pressure falls, while yet sustaining and augmenting further expansion. This, then, increases the velocity of the fluid discharged from the nozzle through outlet 16. In this way, very high velocities may be obtained, yet the fluid stream is still maintained at a relatively low temperature. Essentially all the heat added is immediately converted to flow energy and is not lost as excess heat in a high temperature fluid stream.

Nozzle 10 is merely one of many similar nozzles making up a turbine. Each has its outlet 16 directed toward blades 21 of a turbine wheel, so that the high-velocity stream of fluid will impinge against the blades and cause the wheel to rotate in the usual manner.

The nozzle of FIG. 2 is rectangular, rather than circular, having broad parallel walls 22 and 23 and a similarly broad, wedge-shaped, center unit 24, whose larger end 24a lies within an inlet portion 25 of the nozzle and provides such nozzle with a double throat 26 of width extending from side-to-side of the nozzle and with divergent passages 27 extending along discharge portion 28 of the nozzle to or almost to outlet 28a. In this embodiment, center unit 24 is not necessarily, but may be, a heater. If a heater, heat is supplied internally in any suitable manner, e.g., as shown in FIG. 6. In any event, nozzle walls 22 and 23 are heated along the length of discharge portion 28 by circulating a heating fluid through respective passages 29 and 30 provided therein. The heating fluid is supplied to such passages from any suitable source, e.g. as shown in FIG. 6, and flows transversely of the flow through the nozzle of compressed fluid from a compressor (not shown).

As illustrated, the inside portions 22a and 23a of nozzle walls 22 and 23, respectively, are preferably of material having good heat conductivity, while the outside portions 22b and 23b are of material having poor heat conductivity to minimize heat loss. Also, if center unit 24 is a heater, its larger end 24a is preferably of material having poor heat conductivity to prevent heating of the compressed fluid as it flows through inlet portion 25 of the nozzle.

FIGS. 4, 5, and 6, illustrate how a nozzle such as shown in FIG. 2 may be incorporated in a nozzle block as used on most gas turbines of conventional construction. The nozzle block is built to confront a section of the periphery of the blade portion of turbine wheel 33. As shown in FIG. 6, the block extends through an arc of 60° or one-sixth of the periphery of the turbine wheel. There are two mutually spaced, circular sets of blades 34 in the turbine wheel, the blades of each set being secured to and between an outer support ring 35 and an inner support ring 36 and the latter ring being dovetailed to the main body of the turbine wheel 33 in the usual manner. The blades are shown as velocity-stage type, but a single row of pressure-stage type may similarly be used, or several such stages may be arranged in a series to form a multi-stage turbine, as shown diagrammatically in FIG. 11. In the multi-stage turbine, each stage comprises a nozzle block 36 and associated blades 37.

Each nozzle block in the embodiment of FIGS. 4–6 comprises a main supporting section 38, which has positioned therein a plurality of individual nozzles 39 similar to the nozzle shown in FIG. 2, each arranged so that it discharges its high velocity stream of fluid against turbine blades 34 of the turbine wheel, causing the wheel to rotate. Stationary guide blades 40, projecting from supporting section 41, are positioned between the spaced sets of rotatable blades 34 in the usual manner. Member 41 is secured to section 38 of the nozzle block by bolts 42. A usual reinforcing ring 43 is secured to the outer extremities of stationary blades 34.

A compressed compressible fluid, usually air, is supplied to a first plenum chamber 44 from a suitable source of same and flows through opening 45 when valve 46 is open and into a second plenum chamber 47, which opens directly into nozzle inlets 48 of the nozzles 39. The plenum chambers and the valve seat 46a are formed by the block body section 49, which is attached by bolts 50 to section 38. Valve 46 controls the amount of compressed fluid and thus the pressure of such fluid admitted to the nozzles, which, in turn, controls the speed of the turbine wheel or stops operation of the turbine if closed completely.

Each nozzle has a wedge shaped center unit 51 as a heating element, a hot fluid from any suitable source of same being circulated through passage 52 thereof. Each nozzle comprises a convergent inlet portion, a throat, and an elongate discharge portion provided with divergent flow passage 53, all as described in connection with FIG. 2. Heating passages 54 and 55 are provided in the outside walls 56 and 57, respectively, of the nozzle substantially as are the passages 29 and 30 in the walls 22 and 23 of the nozzle of FIG. 2. They and the passage 52 are provided with a heating fluid through entry passage 58; exhaust being through exit passage 59. The elongate discharge portions of the nozzles extend at an angle to the axis of the turbine wheel, so that maximum pressure will be exerted on the turbine blades 34 by the high velocity fluid streams leaving the nozzle outlets.

Passages 52, 54, and 55 extend through the entire length of the block of FIG. 6, transversely of the nozzle passages 53 thereof, as shown. Hot fluid is circulated through these passageways to heat center units 51 and the inside portions of the nozzle walls 56 and 57 to a temperature higher than that of the compressible fluid flowing through the nozzles.

To lessen heat transfer and loss, heat insulating material 60 lines the portions of passageways 54 and 55 that are adjacent to section 38.

FIG. 10 shows diagrammatically how hot fluid (labeled coolant) may be supplied to the nozzle blocks of a turbine from a nuclear reactor, as in the system of FIG. 3. Six nozzle blocks, each similar to the one shown in FIG. 6, are positioned to form a full circle with their nozzles confronting the turbine wheel and adjacent blocks coupled together for flow of heating fluid through 180° instead of only 60°. The heating fluid is supplied to passage 52 in center unit 51 at an entry 58, from where in this instance it flows 180° to an exit 59 of the next block. The heating fluid is similarly supplied to passages 54 and 55 in the nozzle walls, but the points of entry and exit, here indicated 61 and 62, respectively, are spaced 90° from the entry and exit of the center unit.

In this way, the heating fluid is more evenly distributed in the nozzle block and a more even heat transfer to the compressible fluid flowing through the nozzles takes place.

The nozzle of FIG. 8 is of circular cross-section with a conical center unit 63 as a heating element and with heating passages 64 and 65 in the nozzle walls 66 and 67. The nozzle has an inlet portion 68, which includes a plenum chamber 69. It has a throat 70 and a discharge portion 71 whose flow passage 72 has cross-sectional area which increases from throat to nozzle outlet 73. Conical center unit 63 is provided with flow passages 74 and 75 for heating fluid similar to the corresponding passages of FIG. 1. Hot fluid from a suitable supply of same flows into nozzle wall passage 64 from supply passage 76, which branches off from a main supply passage 77 that also serves passage 74 of center unit 63. Fluid exiting from the interior of center unit 63 by way of annular passage 75 joins, in main exhaust passage 78, fluid exiting from nozzle wall passage 65 through passage 79. Fins 80 projecting from the central heating element, and fins 81 projecting from the nozzle walls, give additional heat transfer surfaces, and, if desired, may be placed so as to cause turbulence in fluid flow through the nozzle.

It is undesirable to actually heat the compressed fluid while it is in the plenum chamber and before it reaches the throat of the nozzle, but a small amount of heat added to the compressed fluid in the plenum chamber is not harmful if added only while such fluid is expanding and cooling and so as to not increase the pressure of such fluid in the chamber or to cause an increase in the volume of such fluid greater than the related simultaneous increase in the quantity of fluid passing the throat of the nozzle.

If it is desired to lessen heat transfer to the plenum chamber in nozzles such as those of FIGS. 1 and 8, the construction shown in FIG. 7 may be used. In FIG. 7, a section 82a of the exterior annular wall 82 of the conical center unit 83 where such unit passes through the plenum chamber 84 of nozzle inlet portion 85 is made double to provide a narrow insulating space 86 for reducing heat flow into the plenum chamber and inlet portion of the nozzle. Such insulating space ends at throat 87.

The series arrangement of three nozzle blocks 36 in FIG. 11 alternating with turbine blades 37 to form a multi-stage turbine, also illustrates how the nozzles may be made divergent along their discharge portions. Opposing interior wall faces 88 of each nozzle 89 diverge from the nozzle throats to the nozzle outlets. In this way, the nozzle is divergent without a convergent insert and still achieves an excellent heat transfer reltionship.

Although no center unit is necessary with a divergent nozzle of this type, a center unit of various configurations that don't destroy the divergent nature of the nozzle may be used for heating purposes.

Since the velocity of the stream of fluid leaving the nozzle is dependent upon the amount of heat that can be transferred to the expanding fluid as it passes through the discharge portion of the nozzle, and because of the very short time period in which the flowing fluid is exposed to the inside of the nozzle, it is important to maximize the heat transfer that takes place. The nozzle may be made longer than the usual turbine nozzle, so that the flowing fluid will have a longer contact time with the heat transfer surfaces than would be true with present length nozzles. Fins, such as described, may project from the heat transfer surfaces to provide additional heat transfer. Also, the heat transfer surfaces may be made reflective by coating or polishing, or may be made of special materials having unusual heat transfer properties.

Laminar flow, as normally desired in conventional turbine nozzles, is not desired in the nozzles of this invention. Increased length of a nozzle will allow a certain amount of turbulence in the fluid flow to take place, and, also, if desired, spoilers may be added to cause turbulence. Turbulence produces cross currents and eddies, which greatly increase heat transfer from heat conductive surfaces to the flowing fluid. Thus, turbulence is desirable in the present invention as against the usually desired laminar flow with its fluid layer to fluid layer conduction.

A large temperature difference between the expanding flowing fluid and the heat transfer surfaces also increases the amount of heat that can be transferred. A large temperature difference makes it possible to transfer substantial quantities of heat to the expanding fluid rapidly and efficiently. Preferably, the compressed fluid in the plenum chamber will contain only the heat generated by compression and have a temperature corresponding to the adiabatic rise in pressure. As the fluid expands into the nozzle, the temperature and pressure fall and the equivalent thermal energy is converted to velocity. After passing the throat, additions of heat to the flowing fluid and conversion of such heat to kinetic energy take place almost simultaneously. Depending on the compression ratio, the temperature of the fluid by the time the throat is reached could well be no more than a few hundred degrees above atmospheric. However, the heating fluid and heating elements may easily attain temperatures between 1000° F. and 1500° F. Thus with heating fluid temperatures no greater than 1500° F, a temperature difference between the expanding fluid and the heating elements of over 1000° F. is possible.

Since the heat added to the expanding fluid counteracts the tendency of such fluid to cool and absorption of heat by the expanding fluid enhances the expansion which normally would have to come from a lowering of the pressure, a substantial advantage is gained. This advantage is comparable to that of a nozzle expanding steam or similar vapor wherein the convertible heat comes from the greater internal heat capacity of the fluid. However in this case the heat comes from a source external to the fluid. Nevertheless, this thermal energy is convertible in the same ratio of heat to velocity as that which is generally obtained in steam nozzles. Because the heat added to the fluid is proportional to the increase in velocity, the rise in fluid temperature is small and the increase in kinetic energy of flow is proportionately large. The temperature of the exhaust from the nozzle, generally referred to as the turbine inlet temperature, is low and the problems associated with highly stressed, critical structural parts at high temperatures are eliminated.

FIG. 9 is a pressure versus volume diagram for the conventional Brayton cycle, ABCDA, and for the cycle of the present invention, ABEFA. In the Brayton cycle, line AB represents compression of the fluid and line BC represents the addition of heat at constant pressure. Expansion in the nozzle is represented by line CD while line DA represents the constant pressure cooling of the fluid to ambient atmospheric temperature. The line DA represents the difference between nozzle discharge temperature and atmospheric temperature and indicates the loss of the thermal energy caused by high discharge temperatures in the Brayton cycle.

For the present invention, line AB represents compression of the fluid and line BEF represents expansion in the nozzle. The portion BE represents adiabatic expansion of the compressible fluid in the flow up to the nozzle throat, while portion EF represents expansion beyond the throat with heat addition. The work done along line CD is equal to that done along line BEF. Line FA represents constant pressure cooling and indicates loss of thermal energy using the nozzle of the present invention. Line FA is much shorter than line DA, because of the low discharge temperature. This indicates that much less thermal energy is lost.

In the electrical power generating system of FIG. 3, nozzles of the invention are incorporated in the turbine. As previously indicated, the hot fluid for heating the nozzles is the coolant from a nuclear reactor. Any commonly used nuclear reactor coolant, such as light water, lithium, sodium, sodium potassium mixtures, various molten metals, certain gases, and organic liquids, may be used. The turbine is directly coupled to an electrical generator.

Another way of supplying heat to the compressible fluid flowing through the nozzles could be combustion of fuel within the center unit, the gases of combustion being exhausted into the compressible fluid flowing through the nozzles. Here, however, the heating element must perform as a flame holder to prevent flame out. In such instances, heat is added to the flowing compressible fluid by reason of both the heated center unit and the hot exhaust gases.

The nozzle of the invention can be used apart from a turbine whereever a high-velocity stream of compressible fluid is desired, for example as a source of thrust.

While air is the most convenient compressible fluid for use with the nozzles, other gases may be used, paticularly in closed systems, such as in submarines, where access to the atmosphere is limited.

The nozzle will operate if the compressed fluid supplied to the inlet is at any significant pressure above the pressure of the atmosphere into which the exhaust stream of fluid is directed. As indicated, however, it is preferred that the fluid be compressed to at least twice that of the exhaust atmosphere, because such pressure will cause the stream of fluid to reach critical velocity as it expands through the nozzle throat and will allow super-critical velocities to be obtained in the discharge portions of the nozzles.

While the invention has been described with reference to specifically illustrated preferred embodiments, it should be realized that various changes may be made without departing from the disclosed inventive subject matter particularlypointed out and claimed herebelow.

I claim:

1. Apparatus for producing a directed, high-velocity stream of compressible fluid, comprising an elongate nozzle having a flow passage therethrough extending from an inlet at one end of the nozzle to an outlet at the other end thereof and having a throat therebetween located near said inlet and dividing the nozzle into a relatively short inlet portion and a relatively long discharge portion, the effective cross-sectional area of the flow passage increasing from said throat to said outlet so as to provide for expansion of fluid flowing through the discharge portion of the nozzle to and through the outlet; means for supplying a compressible fluid to the inlet at greater pressure than the atmosphere into which it is discharged, so that said fluid flows through the flow passage; and means for heating the fluid as it flows through the discharge portion of the nozzle and expands therein.

2. Apparatus according to claim 1, wherein the means for heating the compressible fluid comprises an elongate heating unit positioned within the nozzle and extending along the discharge portion thereof; and means for heating the heating unit to temperature greater than the temperature of the compressible fluid so that heat is transferred to the fluid as it flows through and expands within the discharge portion of the nozzle.

3. Apparatus according to claim 2, wherein the flow passage of the nozzle is annular in cross-section, the heating unit is conical, and the two are concentrically arranged along the longitudinal axis of the nozzle, with the apex of the cone located at or near the outlet of the nozzle.

4. Apparatus according to claim 3, wherein the outlet of the nozzle is substantially no larger than the cross-sectional area of the space defined by the walls of the nozzle at the throat, and wherein the elongate heating unit is convergent, with its large end located adjacent to the inlet.

5. Apparatus according to claim 3, wherein the inner wall faces of the discharge portion of the nozzle converge, and wherein the heating unit converges at a greater rate than do said inside walls of the nozzle.

6. Apparatus according to claim 2, wherein the cross-section of the spaced defined by the walls of the nozzle is rectangular, and wherein the heating unit is coaxially arranged about the compressible fluid-flow-axis of the apparatus.

7. Apparatus according to claim 2, wherein the means for heating the heating unit includes means for circulating a hot fluid therethrough.

8. Apparatus according to claim 7, wherein the means for circulating a hot fluid through the heating unit includes a nuclear reactor for heating the fluid.

9. Apparatus according to claim 2, wherein the means for heating the heating unit is adapted to heat the heating element to a temperature between about 1,000° F. and 1,500° F.

10. Apparatus according to claim 1, wherein the means for heating the compressible fluid comprises means for heating the inside surfaces of the nozzle walls in the discharge portion of the nozzle to a temperature greater than that of the compressible fluid, so that a significant quantity of heat is transferred from the nozzle walls to the fluid as the fluid flows through the discharge portion of the nozzle.

11. Apparatus according to claim 1, wherein the means for supplying compressed fluid to the inlet includes a plenum chamber connecting with said inlet.

12. Apparatus according to claim 1, wherein the means for supplying the fluid to the inlet is adapted to supply the fluid to the inlet at a pressure at least twice that of the atmosphere into which the stream of fluid is exhausted.

13. Apparatus according to claim 1, wherein spoilers are provided in the discharge portion of the nozzle to ensure turbulence of the flowing fluid to promote heat transfer.

14. A gas turbine comprising a set of bladed turbine wheels; a plenum chamber; a series of elongate nozzles having inlets communicating with the plenum chamber and outlets adjacent the blades of the turbine wheels, and having flow passages therethrough extending from the inlets to the outlets and having throats therebetween located near said inlets and dividing the nozzles into relatively short inlet portions and relatively long discharge portions, the effective cross-sectional area of the flow passages increasing from the throats to said outlets so as to provide for expansion of fluid flowing through the discharge portions of the nozzles to and through the outlets; means for supplying a gas to the plenum chamber at a pressure greater than that of the atmosphere adjacent the discharge end of the nozzle; and means for heating the compressible fluid as it flows through the discharge portions of the nozzles, the fluid being discharged from the outlet of the nozzle against said turbine wheels, causing them to rotate.

15. A system for generating electrical power, comprising a nuclear reactor which utilizes a circulating fluid for cooling the reactor; a gas turbine made up of a set of bladed turbine wheels, a plenum chamber, a series of elongate nozzles having inlets communicating with the plenum chamber and outlets adjacent the blades of the turbine wheels, and having flow passages therethrough extending from the inlets to the outlets and having throats therebetween located near said inlets and dividing the nozzles into relatively short inlet portions and relatively long discharge portions, the effective cross-sectional area of the flow passages increasing from the throats to said outlets so as to provide for expansion of fluid flowing through the discharge portions of the nozzles to and through the outlets, means for supplying a gas to the plenum chamber at a pressure greater than that of the atmosphere adjacent the discharge end of the nozzle, and means for heating the compressible fluid as it flows through the discharge portions of the nozzles, the fluid being discharged from the outlet of the nozzle against said turbine wheels, causing them to rotate; means for circulating hot cooling fluid from the reactor through the heating elements of the gas turbine; an electrical generator; and means operatively coupling the turbine to the generator.

16. A method for producing a directed, high-velocity stream of compressible fluid, comprising the steps of compressing a fluid to a pressure greater than that of the atmosphere into which it will be exhausted; flowing the fluid through a passage of continuously increasing cross-sectional area so as to expand said fluid while confining and directing the fluid flow; adding heat to the fluid as it expands, causing it to further expand and to thereby increase the velocity of its flow; and exhausting the fluid as a high velocity, directed stream.

* * * * *